United States Patent
Botha et al.

(10) Patent No.: US 9,077,399 B2
(45) Date of Patent: Jul. 7, 2015

(54) METHOD AND SYSTEM FOR ACHIEVING SPACE AND TIME DIVERSITY GAIN

(71) Applicant: Broadcom Corporation, Irvine, CA (US)

(72) Inventors: Louis Botha, San Diego, CA (US); Philip Koekemoer, San Diego, CA (US); Sang Hun Sung, San Diego, CA (US); Ning Kong, LaJolla, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/785,788

(22) Filed: Mar. 5, 2013

(65) Prior Publication Data

US 2013/0177044 A1      Jul. 11, 2013

Related U.S. Application Data

(63) Continuation of application No. 13/253,352, filed on Oct. 5, 2011, now Pat. No. 8,416,878, which is a continuation of application No. 11/536,368, filed on Sep. 28, 2006, now Pat. No. 8,036,296.

(51) Int. Cl.
| | |
|---|---|
| *H04B 7/10* | (2006.01) |
| *H04L 1/02* | (2006.01) |
| *H04B 7/04* | (2006.01) |

(Continued)

(52) U.S. Cl.
CPC ............ *H04B 7/0413* (2013.01); *H04B 1/7115* (2013.01); *H04B 1/7113* (2013.01); *H04B 7/0669* (2013.01); *H04B 7/0678* (2013.01); *H04B 7/0897* (2013.01)

(58) Field of Classification Search
CPC ................ H04B 2201/70701; H04B 1/7117; H04B 1/7115; H04B 7/0413
USPC ................. 375/130, 137, 143, 152, 267, 347
See application file for complete search history.

(56) References Cited

U.S. PATENT DOCUMENTS

| | | | |
|---|---|---|---|
| 5,754,583 A | 5/1998 | Eberhardt et al. | |
| 6,038,263 A | 3/2000 | Kotzin et al. | |

(Continued)

FOREIGN PATENT DOCUMENTS

| | | |
|---|---|---|
| CN | 1378393 A | 11/2002 |
| CN | 1464638 A | 12/2003 |
| WO | WO 99/07090 A1 | 2/1999 |

OTHER PUBLICATIONS

European Search Report corresponding to European Patent Application No. 07006997.6-1246, mailed Mar. 19, 2008, 3 pages.

*Primary Examiner* — Curtis Odom
(74) *Attorney, Agent, or Firm* — Sterne, Kessler, Goldstein & Fox P.L.L.C.

(57) ABSTRACT

Certain aspects of a method and system for achieving space and time diversity gain are disclosed. Aspects of one method may include modifying a generalization code of at least one pilot channel, to measure signal strengths for each of a plurality of received multipath signals. A portion of the plurality of received multipath signals may be combined based on the measured signal strengths. The signal strengths of the plurality of received multipath signals may be measured on a primary pilot channel by assigning its generalization code to zero. The signal strengths of the plurality of received multipath signals on a secondary pilot channel may measured by assigning its generalization code to a non-zero value.

18 Claims, 12 Drawing Sheets

(51) Int. Cl.
  *H04B 1/7115* (2011.01)
  *H04B 1/7113* (2011.01)
  *H04B 7/06* (2006.01)
  *H04B 7/08* (2006.01)

(56) References Cited

U.S. PATENT DOCUMENTS

| | | |
|---|---|---|
| 7,983,323 B2 | 7/2011 | Kent et al. |
| 8,036,296 B2 | 10/2011 | Botha et al. |
| 2001/0028677 A1 | 10/2001 | Wang et al. |
| 2003/0002454 A1 | 1/2003 | Lee et al. |
| 2003/0021334 A1* | 1/2003 | Levin et al. .................. 375/147 |
| 2003/0072277 A1 | 4/2003 | Subrahmanya et al. |
| 2003/0117980 A1 | 6/2003 | Kim et al. |
| 2003/0235239 A1 | 12/2003 | Li et al. |
| 2004/0114674 A1 | 6/2004 | Lotter et al. |
| 2004/0125771 A1 | 7/2004 | Subrahmanya |
| 2004/0240531 A1 | 12/2004 | Black et al. |
| 2005/0013350 A1* | 1/2005 | Coralli et al. ................. 375/148 |
| 2006/0007895 A1 | 1/2006 | Coralli et al. |
| 2007/0071072 A1 | 3/2007 | Banister et al. |
| 2012/0027052 A1 | 2/2012 | Botha et al. |

* cited by examiner

METHOD AND SYSTEM FOR ACHIEVING SPACE AND TIME DIVERSITY GAIN

CROSS-REFERENCE TO RELATED APPLICATIONS

This application is a continuation of U.S. patent application Ser. No. 13/253,352 filed Oct. 11, 2011, which is a continuation of U.S. patent application Ser. No. 11/536,368 filed Sep. 28, 2006, which application makes reference to U.S. patent application Ser. No. 11/173,854 filed Jun. 30, 2005, now U.S. Pat. No. 7,983,323 issued Jul. 19, 2011. Each of the above referenced applications is hereby incorporated herein by reference in its entirety.

FIELD OF THE INVENTION

Certain embodiments of the invention relate to wireless communication systems. More specifically, certain embodiments of the invention relate to a method and system for achieving space and time diversity gain.

BACKGROUND OF THE INVENTION

In most current wireless communication systems, nodes in a network may be configured to operate based on a single transmit and a single receive antenna. However, for many current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, CDMA-based systems, TDMA-based systems, WLAN systems, and OFDM-based systems such as IEEE 802.11 a/g/n, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers. Accordingly, N signals may be simultaneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor in the increased cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

In the case of a single RF chain with multiple antennas, there is a need to determine or estimate separate propagation channels. A simple method may comprise switching to a first receive antenna utilizing, for example, an RF switch, and estimating a first propagation channel. After estimating the first propagation channel, another receive antenna may be selected and its corresponding propagation channel may be estimated. In this regard, this process may be repeated until all the channels have been estimated. However, switching between receive antennas may disrupt the receiver's modem and may lower throughput. Moreover, this approach may require additional hardware and may also result in propagation channel estimates at different time intervals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for achieving space and time diversity gain, substantially as shown in and/or described in connection with at least one of the figures, as set forth more completely in the claims.

Those and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for achieving space and time diversity gain. Certain aspects of the invention may comprise modifying a generalization code of at least one pilot channel, to measure signal strengths for each of a plurality of received multipath signals. A portion of the plurality of received multipath signals may be combined based on the measured signal strengths. The signal strengths of the plurality of received multipath signals may be measured on a primary pilot channel by assigning its generalization code to zero. The signal strengths of the plurality of received multipath signals on a secondary pilot channel may be measured by assigning its generalization code to a non-zero value.

Figure 1A:
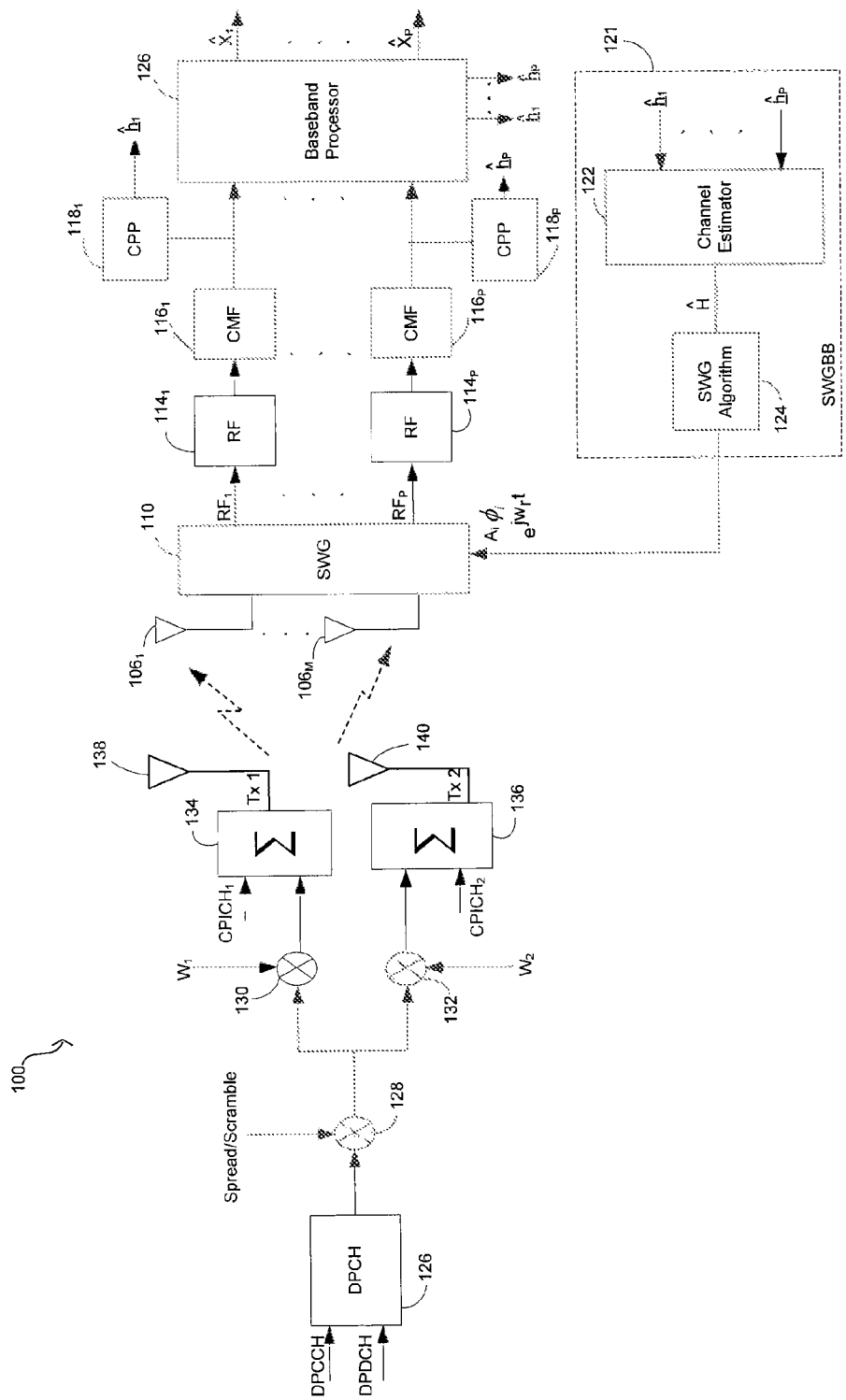
FIG. 1A is a block diagram of exemplary 2 Tx antenna and M Rx antenna wireless communication system with multiple RF chains and receiver channel estimation, in accordance with an embodiment of the invention.

FIG. 1A is a block diagram of exemplary 2 Tx antenna and M Rx antenna wireless communication system with multiple RF chains and receiver channel estimation, in accordance with an embodiment of the invention. Referring to FIG. 1A, the wireless system 100 may comprise a dedicated physical channel (DPCH) block 126, a plurality of mixers 128, 130 and 132, a plurality of combiners 134 and 136, a first transmit antenna (Tx 1) 138 and an additional transmit antenna (Tx 2) 140 on the transmit side. On the receive side, the wireless system 100 may comprise a plurality of receive antennas $106_{1...M}$, a single weight generator (SWG) 110, a plurality of RF blocks $114_{1...P}$, a plurality of chip matched filters (CMF) $116_{1...P}$, a baseband (BB) processor 126, and a single weight generator baseband processor (SWGBB) 121. The SWGBB 121 may comprise a channel estimator 122 and a single weight generator (SWG) algorithm block 124.

The DPCH 126 may be enabled to receive a plurality of input channels, for example, a dedicated physical control channel (DPCCH) and a dedicated physical data channel (DPDCH). The DPCH 126 may simultaneously control the power of DPCCH and DPDCH. The mixer 128 may be enabled to mix the output of DPCH 126 with a spread and/or scrambled signal to generate a spread complex valued signal that may be input to mixers 130 and 132. The mixers 130 and 132 may weight the complex valued input signals with weight factors $W_1$ and $W_2$, respectively, and may generate outputs to a plurality of combiners 134 and 136 respectively. The combiners 134 and 136 may combine the outputs generated by mixers 130 and 132 with common pilot channel 1 (CPICH1) and common pilot channel 2 (CPICH2) respectively. The common pilot channels 1 and 2 may have a fixed channelization code allocation that may be utilized to measure the phase amplitude signal strength of the channels. The weights $W_1$ and $W_2$ may be utilized, for example, and phase and or amplitude adjustments may be generated by the single weight generator (SWG) algorithm block 124. The antennas 138 and 140 may receive the generated outputs from the combiners 134 and 136 and may transmit wireless signals.

The plurality of receive antennas $106_{1...M}$ may each receive at least a portion of the transmitted signal. The SWG 110 may comprise suitable logic, circuitry, and/or code that may be enabled to determine a plurality of weights to be applied to each of the input signals $R_{1...M}$. The SWG 110 may be enabled to modify the phase and amplitude of a portion of the transmitted signals received by the plurality of receive antennas $106_{1...M}$ and generate a plurality of output signals $RF_{1...P}$.

The plurality of RF blocks $114_{1...P}$ may comprise suitable logic, circuitry, and/or code that may be enabled to process an RF signal. The RF blocks $114_{1...P}$ may perform, for example, filtering, amplification, and analog-to-digital (A/D) conversion operations. The plurality of transmit antennas 138 and 140 may transmit the processed RF signals to a plurality of receive antennas $106_{1...M}$. The single weight generator SWG 110 may comprise suitable logic, circuitry, and/or code that may be enabled to determine a plurality of weights, which may be applied to each of the input signals. The single weight generator SWG 110 may be enabled to modify the phase and amplitude of at least a portion of the signals received by the plurality of receive antennas $106_{1...M}$ and generate a plurality of output signals $RF_{1...P}$. The plurality of RF receive blocks $114_{1...P}$ may comprise suitable logic, circuitry and/or code that may be enabled to amplify and convert the received analog RF signals $RF_{1...P}$ down to baseband. The plurality of RF receive blocks $114_{1...P}$ may each comprise an analog-to-digital (A/D) converter that may be utilized to digitize the received analog baseband signal.

The plurality of chip matched filters (CMF) $116_{1...P}$ may comprise suitable logic, circuitry and/or code that may be enabled to filter the output of the plurality of RF receive blocks $114_{1...P}$ so as to produce in-phase (I) and quadrature (Q) components (I, Q). In this regard, in an embodiment of the invention, the plurality of chip matched filters (CMF) $116_{1...P}$ may comprise a pair of digital filters that are enabled to filter the I and Q components to within the bandwidth of W-CDMA baseband (3.84 MHz). The outputs of the plurality of chip matched filters (CMF) $116_{1...P}$ may be transferred to the BB processor 126.

The BB processor 126 may be enabled to receive a plurality of in-phase and quadrature components (I, Q) from a plurality of chip matched filters (CMF) $116_{1...P}$ and generate a plurality of baseband combined channel estimates $\hat{\underline{h}}_1$ to $\hat{\underline{h}}_P$. The BB processor 126 may be enabled to generate a plurality of estimates $\hat{X}_1$ to $\hat{X}_P$ of the original input spatial multiplexing sub-stream signals or symbols $X_1$ to $X_P$. The BB processor 126 may be enabled to separate the different space-time channels utilizing a Bell Labs Layered Space-Time (BLAST) algorithm, for example, by performing sub-stream detection and sub-stream cancellation. The capacity of transmission may be increased almost linearly by utilizing the BLAST algorithm.

The plurality of cluster path processors CPP $118_{1...P}$ may generate a plurality of baseband combined channel estimates $\hat{\underline{h}}_1$ to $\hat{\underline{h}}_P$ that may correspond to the plurality of receive antennas $106_{1...M}$. The channel estimator 122 may comprise suitable logic, circuitry, and/or code that may be enabled to process the received estimates $\hat{\underline{h}}_1$ to $\hat{\underline{h}}_P$ from the BB processor

126 and may generate a matrix $\hat{H}$ of processed estimated channels that may be utilized by the single weight generator (SWG) algorithm block 124.

The SWG algorithm block 124 may determine a plurality of amplitude and phase values $A_i$ and $\phi_i$, respectively, which may be utilized by SWG 110 to modify the phase and amplitude of a portion of the transmitted signals received by the plurality of receive antennas $106_{1...M}$ and generate a plurality of output signals $RF_{1...P}$.

Figure 1B:
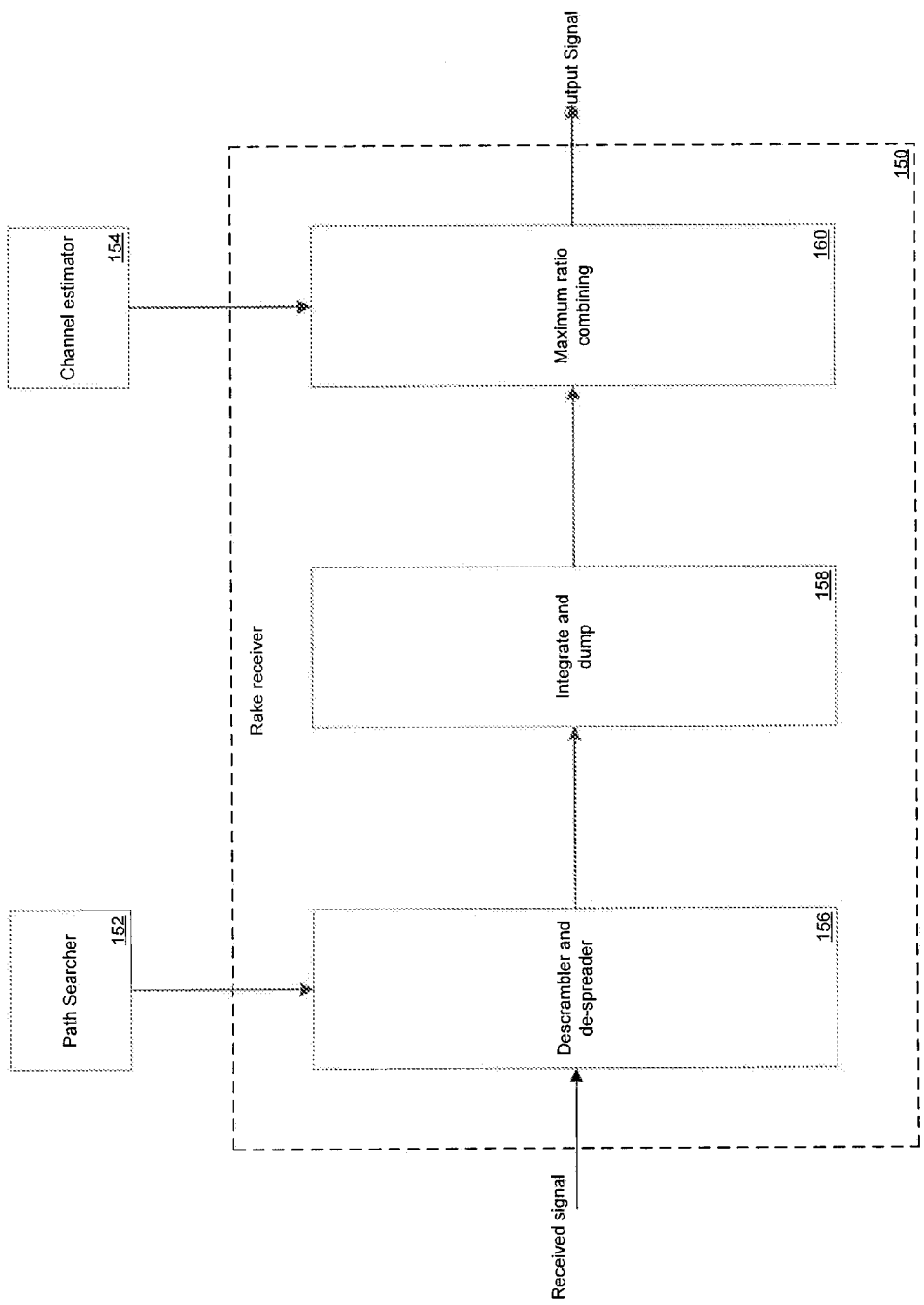
FIG. 1B is an exemplary block diagram of a rake receiver that may be utilized in connection with an embodiment of the invention.

FIG. 1B is an exemplary block diagram of a rake receiver that may be utilized in connection with an embodiment of the invention. Referring to FIG. 1B, there is shown a rake receiver 150, a path searcher 152, and a channel estimator 154.

The rake receiver 150 may comprise a descrambler and despreader 156, an integrate and dump block 158, and a maximum ratio combining (MRC) block 160. The rake receiver 150 may be a radio receiver that may be designed to counter the effects of multipath fading by using a plurality of sub-receivers. Each sub-receiver may be delayed in order to tune to an individual multipath component. Each component may be decoded independently, and combined, which may result in a higher signal-to-noise ratio (SNR) (or Eb/No) in a multipath environment.

In the rake receiver 150, one rake finger may be assigned to each multipath, which may result in maximizing the amount of received signal energy. Each of these different multipath signals may be combined to form a composite signal that may have substantially better characteristics than a single path. The received signal may be split into a plurality of independent paths, which may be combined with their corresponding channel estimates.

The descrambler and despreader 156 may comprise suitable logic, circuitry and/or code that may be enabled to multiply the received signals by a scrambling code and delayed versions of the scrambling code. The delays may be determined by the path searcher 152 prior to descrambling. Each delay may correspond to a separate multipath that may be combined by the rake receiver 150. The descrambler and despreader 156 may be enabled to despread the descrambled data of each path by multiplying the descrambled data with the spreading code.

The integrate and dump block 158 may comprise suitable logic, circuitry and/or code that may be enabled to integrate the despread data over one symbol period, for example, and generate one complex sample output per quadrature phase-shift keying (QPSK) symbol. This process may be carried out for all the paths that are combined by the rake receiver 150.

The MRC block 160 may comprise suitable logic, circuitry and/or code that may be enabled to combine the same symbols obtained via different paths using the corresponding channel information and a combining scheme like maximum ratio combing (MRC) and an output signal may be generated.

The channel estimator 154 may comprise suitable logic, circuitry and/or code that may be enabled to estimate the channel phase and amplitude for each of the identified paths. The channel phase and amplitude may be used for combining each path of the received signal.

The path searcher 152 may comprise suitable logic, circuitry and/or code that may be enabled to estimate the delay of each path in a composite received signal. The received signal may be delayed by an amount estimated by the path searcher 152 and multiplied by the conjugate of the scrambling and spreading code. The descrambled and despread data may be summed over one symbol period, for example.

In a W-CDMA downlink traffic channel, pilot symbols, for example, 2 to 8 symbols and control symbols may be transmitted during the W-CDMA frame slots. There are 15 slots per W-CDMA frame and each frame may be 10 ms long, for example. In the downlink of the W-CDMA system, a common pilot control channel (CPICH) may be transmitted with a higher power than the dedicated traffic channels. The CPICH channel may be received by all the mobiles in a given cell. The CPICH may be transmitted with a constant spreading factor (SF) of 256, for example, and a spreading code of all ones, for example. For example, there may be 10 symbols per slot and 150 symbols per frame of CPICH. At the receiver end, the CPICH symbols as pilot symbols may be used for channel estimation.

Figure 2:
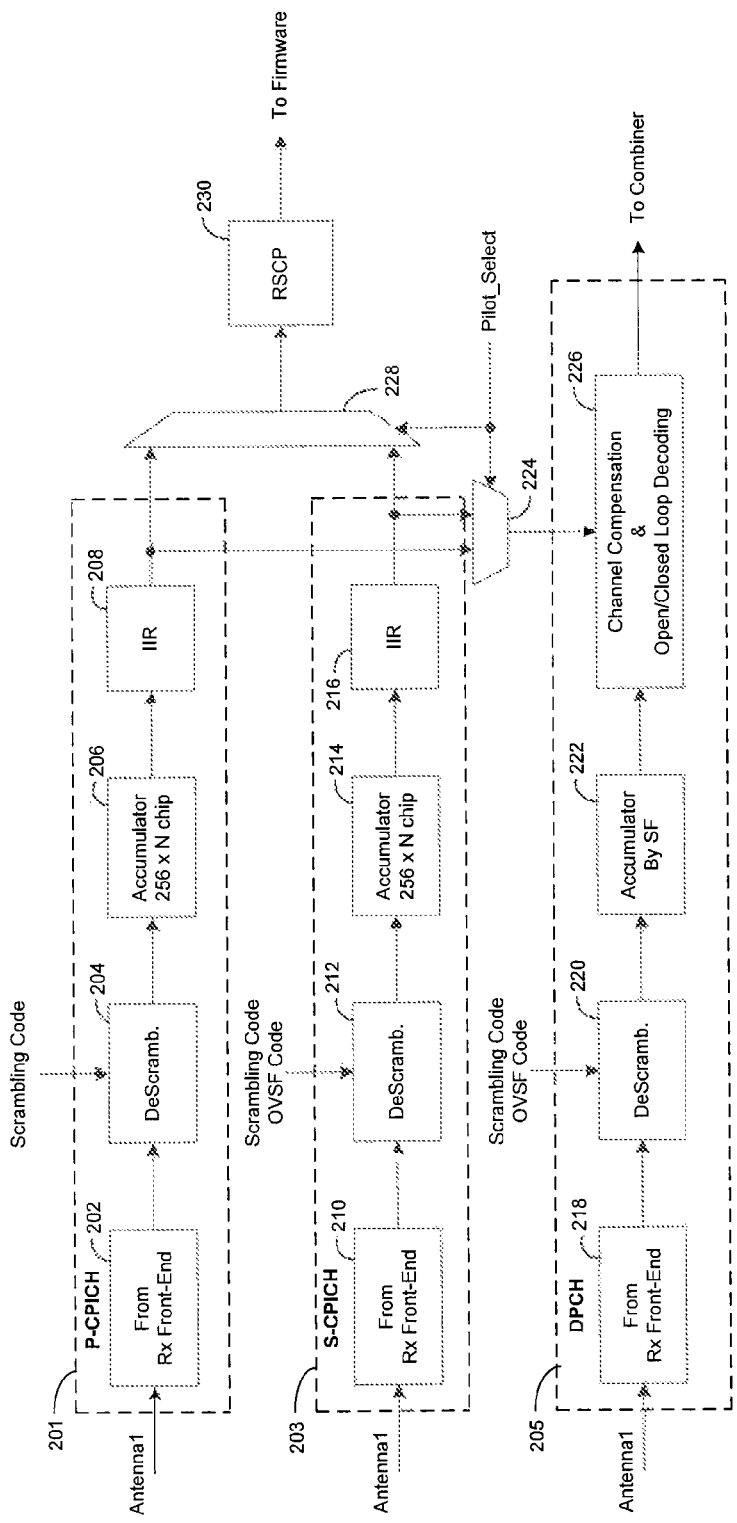
FIG. 2 is a block diagram of an exemplary finger structure for multipath diversity, in accordance with an embodiment of the invention.

FIG. 2 is a block diagram of an exemplary finger structure for multipath diversity, in accordance with an embodiment of the invention. Referring to FIG. 2, there is shown a primary common pilot channel (P-CPICH) 201, a secondary common pilot channel (S-CPICH) 203, a dedicated physical channel (DPCH) 205, a plurality of multiplexers 224 and 228, and a received signal code power (RSCP) block 230.

The P-CPICH 201 may comprise a receiver frontend block 202, a descrambler 204, an accumulator 206, and an IIR filter 208. The S-CPICH 203 may comprise a receiver frontend block 210, a descrambler 212, an accumulator 214, and an IIR filter 216. The DPCH 205 may comprise a receiver frontend block 218, a descrambler 220, an accumulator 222, and a channel compensation and decoding block 224.

The plurality of receiver frontend blocks 202, 210 and 218 may comprise suitable logic, circuitry, and/or code that may be enabled to process a received RF signal from antenna 1. The plurality of receiver frontend blocks 202, 210 and 218 may perform, for example, filtering, amplification, and analog-to-digital (A/D) conversion operations. The plurality of receiver frontend blocks 202, 210 and 218 may be enabled to amplify and convert the received analog RF signals down to baseband. The plurality of receiver frontend blocks 202, 210 and 218 may each comprise an analog-to-digital (A/D) converter that may be utilized to digitize the received analog baseband signal.

The plurality of descramblers 204, 212 and 220 may comprise suitable logic, circuitry, and/or code that may be enabled to multiply the received signals by a scrambling code and delayed versions of the scrambling code. The delays may be determined by the path searcher 152 prior to descrambling. Each delay may correspond to a separate multipath that may be combined by the rake receiver 150. The plurality of descramblers 204, 212 and 220 may be enabled to despread the descrambled data of each path by multiplying the descrambled data with the spreading code. The descramblers 212 and 220 may also be enabled to multiply the received signals by a scrambling code and/or orthogonal variable spreading factor (OVSF) code.

The plurality of accumulators 206, 214 and 222 may comprise suitable logic, circuitry, and/or code that may be enabled to accumulate the descrambled signals from the plurality of descramblers 204, 212 and 220 respectively. The plurality of IIR filters 208 and 216 may comprise suitable logic, circuitry, and/or code that may be enabled to IIR filter the received signal paths from the plurality of accumulators 206 and 214 respectively.

The P-CPICH 201 may process the primary pilot signal to estimate the channel and to perform maximal ratio combining. The S-CPICH 203 may process the secondary pilot signal whenever the secondary pilot is required for demodulation. The DPCH 205 may process the data based on the channel information received either from P-CPICH 201 or S-CPICH 203.

The multiplexer 224 may utilize a pilot select signal to select one of the pilot signals, for example, either P-CPICH 201 or S-CPICH 203 and generate an output to the channel compensation and decoding block 226. The channel compensation and decoding block 226 may utilize the pilot signal selected by the multiplexer 224. The channel compensation and decoding block 226 may be enabled to combine the same symbols obtained via different paths using the corresponding channel information and a combining scheme like maximum ratio combing (MRC) and an output signal may be generated.

The multiplexer 228 may utilize a pilot select signal to select one of the pilot signals, for example, either P-CPICH 201 or S-CPICH 203, and accordingly generate an output to the RSCP block 230. The RSCP block 230 may comprise suitable logic, circuitry, and/or code that may be enabled to measure the receive signal code power of the selected pilot signal.

The process of achieving diversity gain may be utilized to combat multipath fading in wireless cellular communication systems, since the signal quality may be improved without increasing the transmit power or loss of bandwidth efficiency. In a single antenna W-CDMA handset, the fading from different multipath signals may be independent. The receiver may be enabled to demodulate the same signal from a few different multipath signals and combine the various multipath signals. The resulting combined signal may be stronger than a single signal.

Figure 3:
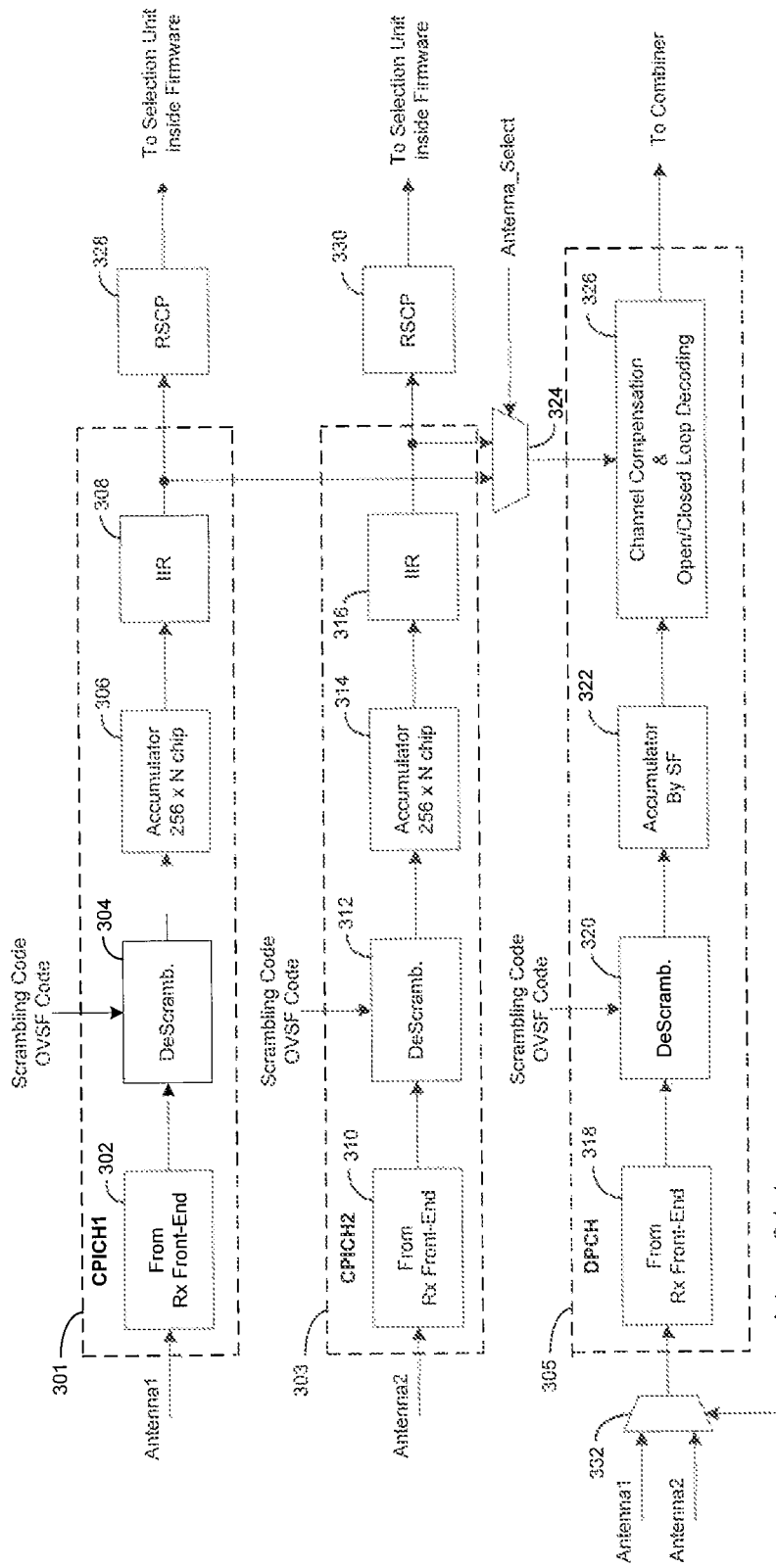
FIG. 3 is a block diagram of an exemplary finger structure for antenna and multipath diversity, in accordance with an embodiment of the invention.

FIG. 3 is a block diagram of an exemplary finger structure for antenna and multipath diversity, in accordance with an embodiment of the invention. Referring to FIG. 3, there is shown a common pilot channel 1 (CPICH1) 301, a common pilot channel 2 (CPICH2) 303, a dedicated physical channel (DPCH) 305, a plurality of multiplexers 324 and 332, and a plurality of received signal code power (RSCP) blocks 328 and 330.

The CPICH1 301 may comprise a receiver frontend block 302, a descrambler 304, an accumulator 306, and an IIR filter 308. The CPICH2 303 may comprise a receiver frontend block 310, a descrambler 312, an accumulator 314, and an IIR filter 316. The DPCH 305 may comprise a receiver frontend block 318, a descrambler 320, an accumulator 322, and a channel compensation and decoding block 324.

The receiver frontend block 302 may comprise suitable logic, circuitry, and/or code that may be enabled to process a received RF signal from antenna 1. The receiver frontend block 310 may comprise suitable logic, circuitry, and/or code that may be enabled to process a received RF signal from antenna 2. The receiver frontend block 318 may comprise suitable logic, circuitry, and/or code that may be enabled to process a received RF signal from either antenna 1 or antenna 2. The multiplexer 332 may utilize an antenna select signal to select a received signal from one of antenna 1 and antenna 2 and generate an output to the receiver frontend block 318. The plurality of receiver frontend blocks 302, 310 and 318 may perform, for example, filtering, amplification, and analog-to-digital (A/D) conversion operations. The plurality of receiver frontend blocks 302, 310 and 318 may be enabled to amplify and convert the received analog RF signal down to baseband. The plurality of receiver frontend blocks 302, 310 and 318 may comprise an analog-to-digital (A/D) converter that may be utilized to digitize the received analog baseband signal.

The plurality of descramblers 304, 312 and 320 may comprise suitable logic, circuitry, and/or code that may be enabled to multiply the received signal by a scrambling code and delayed versions of the scrambling code. The delays may be determined by the path searcher 152 prior to descrambling. Each delay may correspond to a separate multipath that may be combined by the rake receiver 150. The plurality of descramblers 304, 312 and 320 may be enabled to despread the descrambled data of each path by multiplying the descrambled data with the spreading code. The plurality of descramblers 304, 312 and 320 may also be enabled to multiply the received signals by a scrambling code and/or orthogonal variable spreading factor (OVSF) code.

The plurality of accumulators 306, 314 and 322 may comprise suitable logic, circuitry, and/or code that may be enabled to accumulate the descrambled signals from the plurality of descramblers 304, 312 and 320 respectively. The plurality of IIR filters 308 and 316 may comprise suitable logic, circuitry, and/or code that may be enabled to IIR filter the received signal paths from the plurality of accumulators 306 and 314 respectively and generate an output signal to the RSCP blocks 328 and 330 respectively.

The multiplexer 324 may utilize a pilot select signal to select one of the pilot signals, for example, either CPICH1 301 or CPICH2 303 and generate an output to the channel compensation and decoding block 326. The channel compensation and decoding block 326 may utilize the pilot signal selected by the multiplexer 326. The channel compensation and decoding block 326 may be enabled to combine the same symbols obtained via different paths using the corresponding channel information and a combining scheme like maximum ratio combing (MRC) and an output signal may be generated.

The RSCP block 328 may comprise suitable logic, circuitry, and/or code that may be enabled to measure the receive signal code power or the SNR of the plurality of multipath signals from antenna 1 and generate the output signals to a selection control unit. The RSCP block 330 may comprise suitable logic, circuitry, and/or code that may be enabled to measure the receive signal code power or the SNR of the plurality of multipath signals from antenna 2 and generate the output signals to a selection control unit.

The generalization code of at least one pilot channel, for example, CPICH1 301 or CPICH2 303, which may measure signal strengths for each of a plurality of received multipath signals may be modified. The signal strengths of the plurality of received multipath signals may be measured on a primary pilot channel, CPICH1 301, for example, by assigning its generalization code or scrambling code in the descrambler 304 to zero. The signal strengths of the plurality of received multipath signals may be measured on a secondary pilot channel, for example, CPICH2 303 by assigning its generalization code or scrambling code in the descrambler 312 to a non-zero value.

In accordance with an embodiment of the invention, a plurality of the strongest multipath signals may be chosen for demodulation, for example, six out of twelve multipath signals may be chosen based on their measured SNR. The CPICH1 301 and CPICH2 303 may be utilized simultaneously to monitor the signals from the two antennas, antenna 1 and antenna 2. The strongest signal paths may be processed by the DPCH 305 based on their measured SNR.

Figure 4:
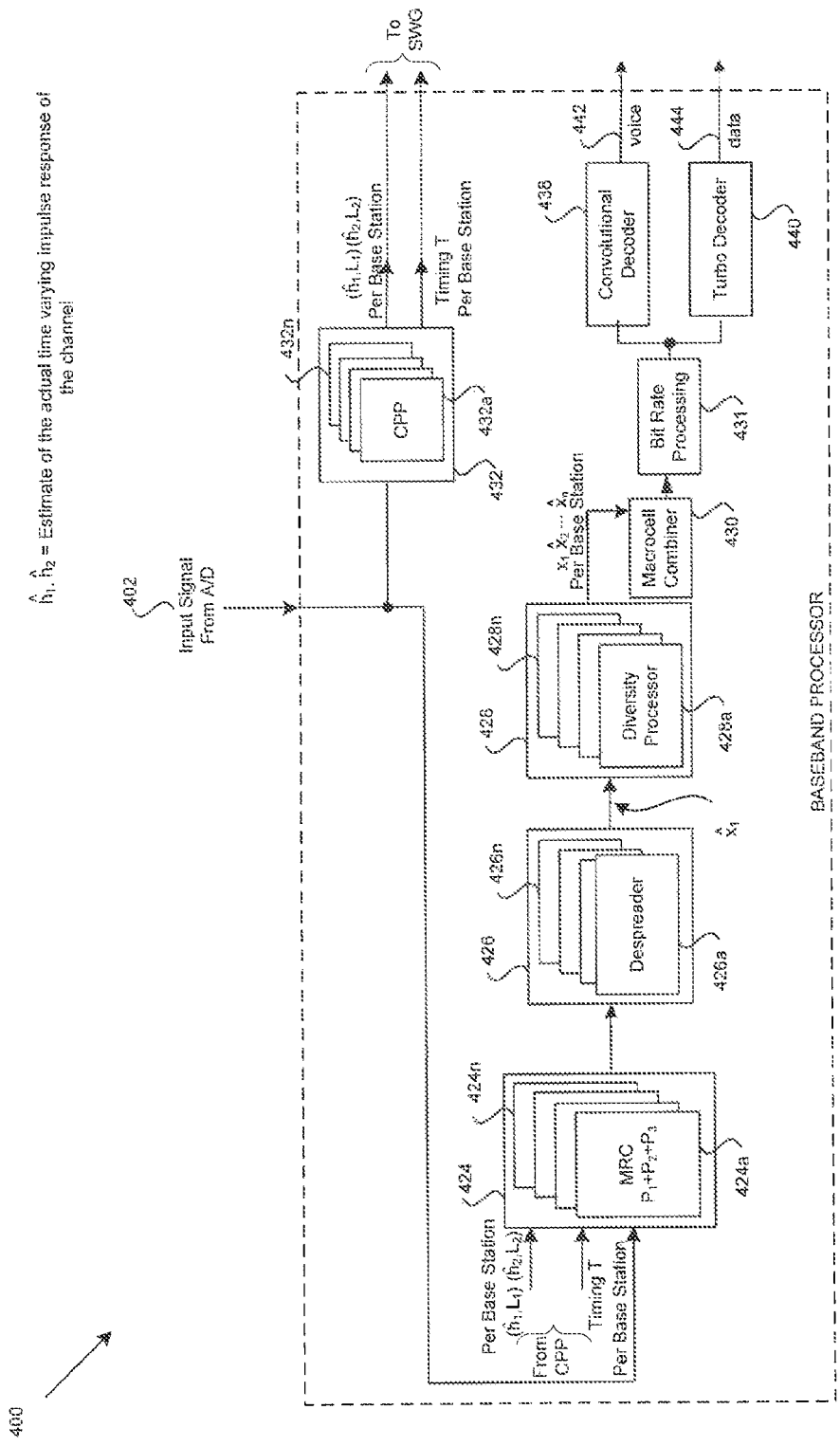
FIG. 4 is a block diagram of an exemplary baseband processor that may be utilized within a MIMO system, in accordance with an embodiment of the invention.

FIG. 4 is a block diagram of an exemplary baseband processor that may be utilized within a MIMO system, in accordance with an aspect of the invention. Referring to FIG. 4, the baseband processor 400 may comprise a cluster path processor (CPP) block 432, a maximum ratio combining (MRC) block 424, a despreader block 426, a diversity processor block 428, a macrocell combiner block 430, a bit rate processing block 431, a convolutional decoder block 438, and a turbo decoder block 440.

U.S. application Ser. No. 11/173,854 provides a detailed description of signal clusters and is hereby incorporated herein by reference in its entirety.

The CPP block 432 may comprise a plurality of cluster processors that may be enabled to receive and process an input signal 502 received from a chip matched filter (CMF), for example. In the baseband receiver processor 400, the CPPs 432a, ..., 432n within the CPP block 432 may be partitioned into pairs of processors, wherein each pair of processor may be enabled to track time-wise and estimate the complex phase and amplitude of the element in the cluster. A cluster may comprise an aggregate of received multipath signals with maximum (max) time difference that may be no more than 16×1/3.84e6 seconds, for example. Under these circumstances, the need for two processors may be derived from the fact that the W-CDMA standard facilitates a receiving mude in which the transmitted signal is transmitted over two antennas, which necessitates the two processors. These receiving modes comprise close loop 1 (CL1), close loop 2 (CL2), and STTD. The CPP block 432 may be enabled to determine estimates of the entire transfer function of the channel and may recover channels on a per base station basis.

The CPP block 432 may be enabled to generate channel estimates $\hat{h}_1$ and $\hat{h}_2$ of the actual time varying impulse response of the channel per base station. The CPP 432 may also generate timing information T on per base station basis related to signals received by antennas at the receive side, such as antennas $106_1 \ldots _M$ of FIG. 1E, for example. Corresponding lock indicators $L_1$ and $L_2$ may also be generated by the cluster processors. The lock indicators may provide an indication of which components in the corresponding estimates comprise valid component values. In one embodiment of the invention, cluster path processors 432a, ..., 432n may be configured to operate in pairs when a transmitted signal is transmitted by two antenna, where the two antenna may be located in the same base station, or at different base stations. The channel estimates $\hat{h}_1$ and $\hat{h}_2$ of the actual time varying impulse response of the channel per base station, as well as lock indicators L1 and L2, and the timing information T per base station may be communicated to a single weight generation (SWG) block, for example, as well as to the maximum-ratio combining (MRC) block 424 for further processing. The channel estimates $\hat{h}_1$ and $\hat{h}_2$, the lock indicators L1 and L2, and the timing information T may be utilized by an SWG block for generating a single weight (SW) control signal for phase shifting of one or more signals received by receiver antennas.

The maximum-ratio combining block 424 may comprise suitable logic, circuitry and/or code to receive timing reference signals, T, and channel estimates and lock indicators, ($\hat{h}1$,L1) and ($\hat{h}2$,L2), from the corresponding cluster path processor block 432, which may be utilized by the maximum-ratio combining block 424 to process received signals from a chip matched filter (CMF) block, for example. The maximum ratio combining block 424 may utilize channel estimate components that are valid in accordance with the corresponding lock indicator. Channel estimate components that are not valid, in accordance with the corresponding lock indicator, may not be utilized. The maximum-ratio combining block 424 may be enabled to provide a combining scheme or mechanism for implementing a rake receiver which may be utilized with adaptive antenna arrays to combat noise, fading, and/or co-channel interference.

In accordance with an embodiment of the invention, the maximum-ratio combining block 424 may comprise suitable logic, circuitry, and/or code that may be enabled to add individual distinct path signals, received from the assigned RF channel, together in such a manner to achieve the highest attainable signal to noise ratio (SNR). The highest attainable SNR may be based upon a maximum ratio combiner. A maximum ratio combiner is a diversity combiner in which each of multipath signals from all received multipath signals are added together, each with unique gain. The gain of each multipath before summing can be made proportional to received signal level for the multipath, and inversely proportional to the multipath noise level. Each of the maximum-ratio combining blocks may be also be enabled to utilize other techniques for signal combining such selection combiner, switched diversity combiner, equal gain combiner, or optimal combiner.

In one embodiment of the invention, the assignment of fingers in the maximum-ratio combining block 424 may be based on channel estimates h1 and h2 from the cluster path processor block 432. The proportionality constants utilized in the maximum-ratio combining block 424 may be based on the valid channel estimates, $\hat{h}1$ and $\hat{h}2$, from the cluster path processor block 432.

The despreader (DS) block 426 may comprise a plurality of despreader blocks 426a, ..., 426n. Each of the despreader blocks 426a, ..., 426n may comprise suitable logic, circuitry, and/or code that may be enabled to despread received signals that may have been previously spread through the application of orthogonal spreading codes in the transmitter. Prior to transmission of an information signal, known as a "symbol", the transmitter may have applied an orthogonal spreading code that produced a signal comprising a plurality of chips. The DS block 426 may be enabled to generate local codes, for example Gold codes or orthogonal variable spreading factor (OVSF) codes that may be applied to received signals through a method that may comprise multiplication and accumulation operations. Processing gain may be realized after completion of integration over a pre-determined number of chips in which the symbol is modulated.

Following despreading at the receiver, the original symbol may be extracted. W-CDMA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which may be equivalent to the code that was utilized for generating the spread spectrum signal. Similarly to the CPP block 432 and the MRC block 424, the DS block 426 may be assigned on a per base station basis, with the MRC block 424 communicating with the DS block 426 that may be assigned to the same base stations.

The diversity processor 428, comprising a plurality of diversity processor blocks 428a, ..., 428n, may comprise suitable logic, circuitry, and/or code that may be enabled to combine signals transmitted from multiple antennas in diversity modes. The diversity modes may comprise OL, CL1 and CL2. The diversity processor 428 may combine signals transmitted from multiple antennas that are located at the same base station. Similarly with the cluster path processors 432, the maximum-ratio combining blocks 424, and the despreader blocks 426, the diversity processors 428 may be assigned on a per base station basis, with the diversity processors 428 communicating with despreader blocks 426 that may be assigned to the same base stations.

The macrocell combiner 430 may comprise suitable logic, circuit and/or code and may be enabled to achieve macroscopic diversity. The macroscopic diversity scheme may be utilized for combining two or more long-term lognormal signals, which may be obtained via independently fading paths received from two or more different antennas at different base-station sites. The microscopic diversity schemes may be utilized for combining two or more short-term Rayleigh signals, which are obtained via independently fading paths received from two or more different antennas but only one receiving site.

The bit rate processing block 431 may comprise suitable logic, circuitry and/or code to process frames of data received from the macrocell combiner 430. The processing may further comprise depuncturing, and deinterleaving data in the received frame, and further determining a rate at which processed frames are communicated in output signals.

The convolutional decoder 438 may comprise suitable logic, circuitry and/or code that may be utilized to handle decoding of convolutional codes as indicated in the 3GPP specification. The output of the convolutional decoder may be a digital signal, which comprises voice information, suitable for processing by a voice-processing unit. The turbo decoder 440 may comprise suitable logic, circuitry and/or code that may be utilized to handle decoding of turbo codes as indicated in the 3GPP specification. The output of the turbo decoder 440 may be a digital signal, which has data information, such that it may be suitable for use by a video display processor.

The maximum-ratio combining block 424 may be enabled to utilize the channel estimates and lock indicators $(\hat{h}1,L1)$, $(\hat{h}2,L2)$ and timing information T per base station to assign rake fingers to received individual distinct path signals and to assign proportionality constants to each finger. Received individual distinct path signals may be processed in the maximum-ratio combining block 424 as signal clusters comprising a plurality of received individual distinct path signals. In an embodiment of the invention, the maximum-ratio combining block 424 may assign a time, T(n), to the nth grid element of the CPP 432, where the plurality of times T(n) may be based on the timing reference T. Given a time assignment, and a time offset, toff, a given CPP 432, n, may detect an individual distinct path signal that is received during a time interval starting at [T(n)−toff/2], and ending at [T(n)+toff/2].

The individual distinct path signals received collectively for each CPP 432 may constitute a signal cluster. The relationship of the values T(n) among the processing elements of the CPP 432 in the receiver may be such that T(n+1)−T(n) is equal to a constant value for values of n among the set of fingers. Thus, once T is determined, the timing relationships for the receipt of the plurality of individual distinct path signals constituent in the signal cluster may be determined. The time offset value, toff, may represent a time duration, which is at least as long as the period of time required for transmitting the plurality of chips contained in a symbol. For example, if the symbol comprises 16 chips, and the W-CDMA chip rate is 3.84×106 chips/second, then the time offset toff may be (16/3.84×106) seconds or approximately 4 microseconds.

Embodiments of the invention may not be limited to values of the difference T(n+1)−T(n) being constant among all n fingers in a rake receiver. However, each value, T(n), may be based on the timing reference signal, T.

The maximum-ratio combining block 424 may proportionately scale and add the received individual distinct path signals to produce a chip level output, which may be communicated to the despreader block 426. The despreader block 426 may be enabled to despread the chip level signal received from the maximum-ratio combining block 424 to generate estimates of the original transmitted signals. The diversity processor block 428 may be enabled to provide diversity processing and to generate output data estimates on a per base station basis. The macrocell combiner block 430 may achieve macroscopic diversity when a received signal has been transmitted by a plurality of base stations. The bit rate processing block 431 may perform processing tasks comprising depuncture and deinterleave on received frames of data that are communicated in received individual distinct path signals. The bit rate processing block 431 may determine a rate at which to communicate processed frames of data to the convolutional decoder block 438, and/or the turbo decoder block 440. The convolution decoder block 438 may be enabled to perform convolutional decoding on the voice portion of the signal generated from an output of the bit rate processing block 431. The turbo decoder block 440 may be enabled to perform turbo decoding on the data portion of the signal generated from an output of the bit rate processing block 431.

Figure 5:
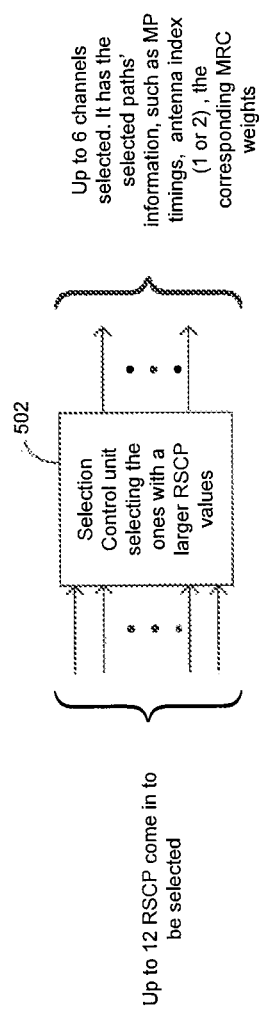
FIG. 5 is a block diagram of an exemplary selection control unit to select a plurality of strongest paths, in accordance with an embodiment of the invention.

FIG. 5 is a block diagram of an exemplary selection control unit to select a plurality of strongest paths, in accordance with an embodiment of the invention. Referring to FIG. 5, there is shown a selection control unit 502.

The selection control unit 502 may comprise suitable logic, circuitry and/or code that may be enabled to receive a plurality of multipath signals along with their corresponding RSCP measurements or SNR measurements. For example, for a rake receiver 150 with 6 fingers, the selection control unit 502 may receive 12 multipath signals from two antennas, antenna 1 and antenna 2, and their corresponding RSCP measurements. The selection control unit 502 may be enabled to select a portion of the plurality of received multipath signals based on the received RSCP measurements. For example, the selection control unit 502 may generate the six strongest multipath signals among the received 12 multipath signals. The selection control unit 502 may also generate information such as multipath timings, antenna index and the corresponding MRC weights of the generated multipath signals. The selection of the DPCH 305 in the six fingers may be for the six strongest paths.

In order to achieve more diversity gain, multiple antennas may be used to provide more signal reception. For example, for handsets, two antennas may be used. With two antennas, the number of resolvable multipath signals may be doubled from that of one antenna. By combining all the multipath signals from both antennas, full diversity gain may be achieved, which may require doubling the number of the existing fingers on the rake receiver for the other antenna. The diversity order may be determined by the total available number of multipath signals for selection and not by the number of multipath signals being selected. The full diversity gain may be achieved from both space or antennas and time or multipath signals. The order of the full diversity gain may be calculated as the product of the number of antennas multiplied by the number of multipath signals.

When there is no fading and the signal is only affected by additive white Gaussian noise (AWGN), the performance in terms of bit error rate (BER) may be represented by the following equation:

$$BER = Q(\sqrt{\alpha SNR}) \approx \frac{1}{2} e^{-\frac{1}{2}\alpha SNR} \qquad (1)$$

where Q(x) is the Q function of a variable x, and α is a constant based on the number of diversity paths. The BER may exponentially decrease as the signal-to-noise ratio (SNR) increases. With Rayleigh fading, SNR may be an exponential random variable and equation (1) may be the conditional BER conditioned on the fading. Therefore, the average BER may be determined by averaging equation (1) with the density function of the SNR, $$\frac{1}{\overline{SNR}}e^{-\frac{1}{\overline{SNR}}SNR}.$$

The average BER with fading, denoted by $\overline{BER}$, may be calculated according to the following equation:

$$\overline{BER} = \int_0^\infty Q(\sqrt{\alpha SNR})\frac{1}{\overline{SNR}}e^{-\frac{1}{\overline{SNR}}SNR}dSNR \approx \frac{1}{4\overline{SNR}} \quad (2)$$

The average $\overline{BER}$ may decrease with an increase in the SNR. In order to enhance the performance, a plurality of multipath signals may be combined, for example L multipath signals may be combined. The resulting $\overline{BER}$ may be calculated according to the following equation:

$$\overline{BER} = \int_0^\infty \cdots \int_0^\infty Q\left(\sum_{i=1}^L SNR_i\right)\prod_{i=1}^L \frac{1}{\overline{SNR_i}}e^{-\frac{1}{\overline{SNR_i}}SNR}dSNR_1 \ldots dSNR_L \quad (3)$$

$$= \frac{1}{4^L}\binom{2L-1}{L}\prod_{i=1}^L \frac{1}{\overline{SNR_i}}$$

When the channel is identically independent, then $\overline{SNR_i} = \overline{SNR}$, for i=1, . . . , L. The equation (3) may be represented by the following equation:

$$\overline{BER} = \frac{1}{4^L}\binom{2L-1}{L}\left(\frac{1}{\overline{SNR_i}}\right)^L \quad (4)$$

After diversity combining, the performance of the channel or average BER may vary according to the inverse of the SNR raised to the $L^{th}$ power. The power of the inverse SNR may be referred to as the diversity order. The joint density function of the strongest m multipath signals among a total of L multipath signals for iid Rayleigh fading may be calculated according to the following equation:

$$f(SNR_1, SNR_2, \ldots SNR_m) = \frac{L!}{(L-m)!}SNR_m^{L-m}\overline{SNR}^L \quad (5)$$

The BER after combining the strongest m multipath signals may be calculated according to the following equation:

$$\overline{BER} = \int_0^\infty \cdots \int_0^\infty Q\left(\sum_{i=1}^m SNR_i\right)\frac{L!}{(L-m)!}SNR_m^{L-m}\overline{SNR}^L dSNR_1 \ldots dSNR_L \quad (6)$$

$$= \frac{1}{4^L}\binom{2L-1}{L}\frac{L!}{m!m^{L-m}}\frac{1}{\overline{SNR_i}^L}$$

From equation (6), the diversity order is L, irrespective of m. There may be a difference between selecting all the multipath signals and selecting m multipath signals for $1 \leq m < L$, which may be defined as the SNR difference. From equation (4) and equation (6), this SNR difference may be calculated according to the following equation:

$$SNR\_diff = [10 \log(L!/m!m^{L-m})/L]dB \quad (7)$$

By combining the strongest 6 multipath signals, the exemplary invention may lose, for example, $[10 \log(12!/6!6^6)/12]$ dB≈0.9 dB. For example, by selecting the six fingers of a rake receiver for a single antenna, the same diversity gain may be achieved as that of two antennas with a SNR loss of less than 1 dB, for example, for the case where there are a total of 12 multipath signals. If there are less than 12 multipath signals, the loss may be less. In each finger of a rake receiver 150, there are two pilot estimators that may not be used simultaneously. In accordance with an embodiment of the invention, the inactive pilot estimators may be utilized to monitor the multipath signals from two antennas without increasing any hardware complexity.

In accordance with an embodiment of the invention, the selection control unit 502 may be enabled to select a portion of the plurality of received multipath signals based on the received RSCP measurements. For example, the selection control unit 502 may generate the six strongest multipath signals among the received 12 multipath signals or a portion of the plurality of received multipath signals that are higher than a particular threshold. The portion of the plurality of received multipath signals selected by the selection control unit 502 may be combined by a maximal ratio combining (MRC) algorithm. For example, the MRC block 424 may be enabled to combine the plurality of received multipath signals selected by the selection control unit 502. The selection control unit 502 may also generate information such as multipath timings, antenna index and the corresponding MRC weights of the generated multipath signals.

Figure 6:
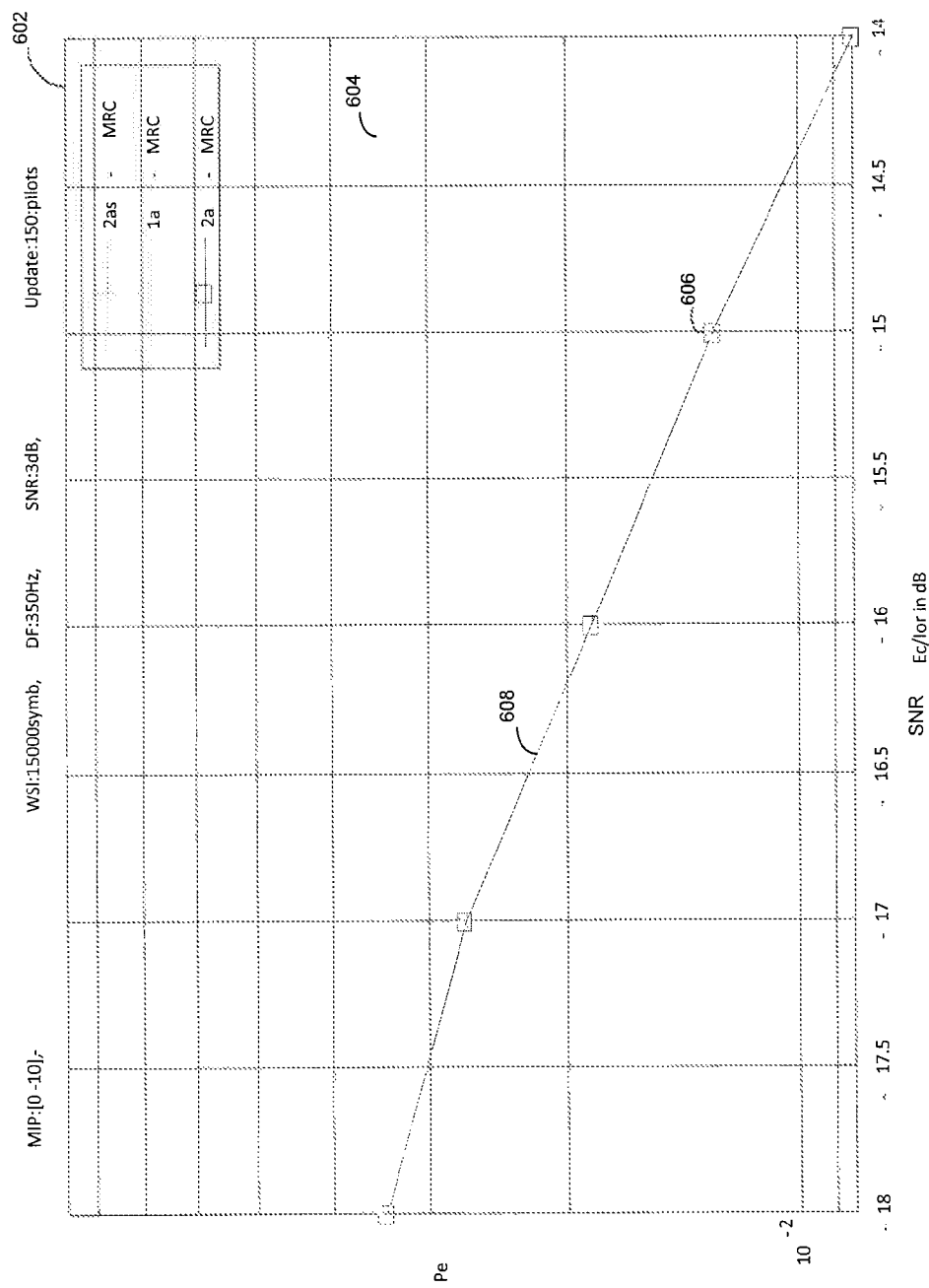
FIG. 6 is a graph illustrating comparison of performance of an exemplary wireless receiver for a first test case, in accordance with an embodiment of the invention.

FIG. 6 is a graph illustrating comparison of performance of an exemplary wireless receiver for a first test case, in accordance with an embodiment of the invention. Referring to FIG. 6, there is shown a graph 602 illustrating comparison of performance of an exemplary wireless receiver for a first test case (Case 1) based on 3GPP TS 25.101. There may be two multipath signals, for example, one multipath at 0 dB and a second multipath at −10 dB. The update rate may be 150 pilot signals and the Doppler frequency may be 350 Hz, for example.

The variation of the probability of error as the SNR or (Ec/Ior) increases may be plotted for three different receiver structures. For the first receiver structure with a single antenna and 6 rake fingers, the probability of error as the SNR or (Ec/Ior) increases may be plotted and may be referred to as 1a-MRC 604. For the second receiver structure with two antennas and 6 rake fingers, the probability of error as the SNR or (Ec/Ior) increases may be plotted and may be referred to as 2as-MRC 606. In this receiver structure, the strongest 6 multipath signals may be chosen based on their measured SNR's and the 6 rake fingers may be utilized to demodulate the strongest 6 multipath signals. For the third receiver structure with two antennas and 12 rake fingers, the probability of error as the SNR or (Ec/Ior) increases may be plotted and may be referred to as 2a-MRC 608. In this case, each finger of the rake receiver may demodulate one multipath signal.

For the second receiver structure with two antennas and 6 rake fingers, the performance may be same as the third receiver structure with two antennas and 12 rake fingers under any updating rate. The gain of the second receiver structure with two antennas and 6 rake fingers compared to the one antenna case may be 3 dB, for example.

Figure 7:
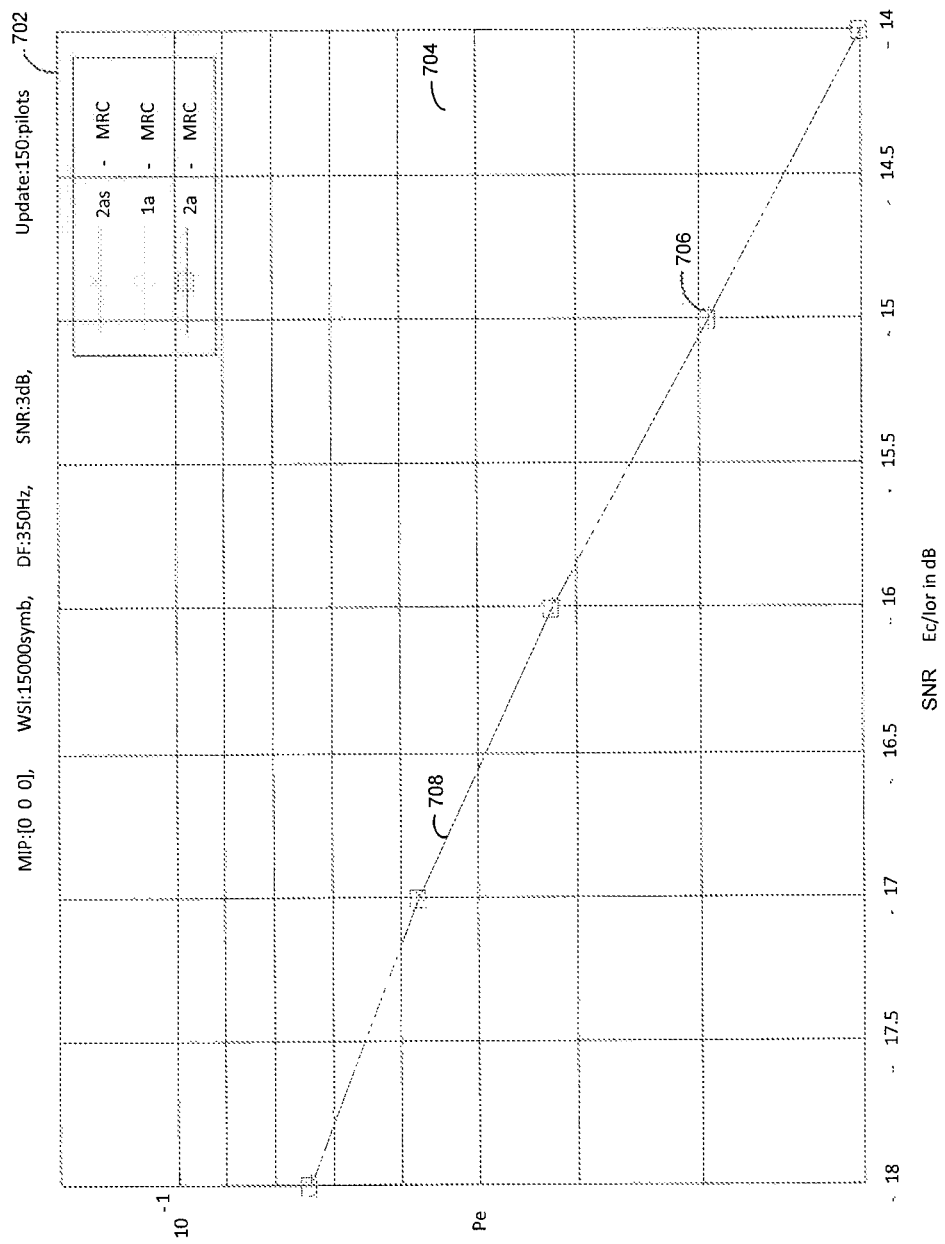
FIG. 7 is a graph illustrating comparison of performance of an exemplary wireless receiver for a second test case, in accordance with an embodiment of the invention.

FIG. 7 is a graph illustrating comparison of performance of an exemplary wireless receiver for a second test case, in accordance with an embodiment of the invention. Referring to FIG. 7, there is shown a graph 702 illustrating comparison of performance of an exemplary wireless receiver for a second test case (Case 2) based on 3GPP TS 25.101. There may be three multipath signals, for example, one multipath at 0 dB, a second multipath at 0 dB and a third multipath at 0 dB. The update rate may be 150 pilot signals and the Doppler frequency may be 350 Hz, for example.

The variation of the probability of error as the SNR or (Ec/Ior) increases may be plotted for three different receiver structures. For the first receiver structure with a single antenna and 6 rake fingers, the probability of error as the SNR or (Ec/Ior) increases may be plotted and may be referred to as 1a-MRC 704. For the second receiver structure with two antennas and 6 rake fingers, the probability of error as the SNR or (Ec/Ior) increases may be plotted and may be referred to as 2as-MRC 706. In this receiver structure, the strongest 6 multipath signals may be chosen based on their measured SNR's and the 6 rake fingers may be utilized to demodulate the strongest 6 multipath signals. For the third receiver structure with two antennas and 12 rake fingers, the probability of error as the SNR or (Ec/Ior) increases may be plotted and may be referred to as 2a-MRC 708. In this case, each finger of the rake receiver may demodulate one multipath signal.

For the second receiver structure with two antennas and 6 rake fingers, the performance may be same as the third receiver structure with two antennas and 12 rake fingers under any updating rate. The gain of the second receiver structure with two antennas and 6 rake fingers compared to the one antenna case may be slightly more than 3 dB, for example.

Figure 8:
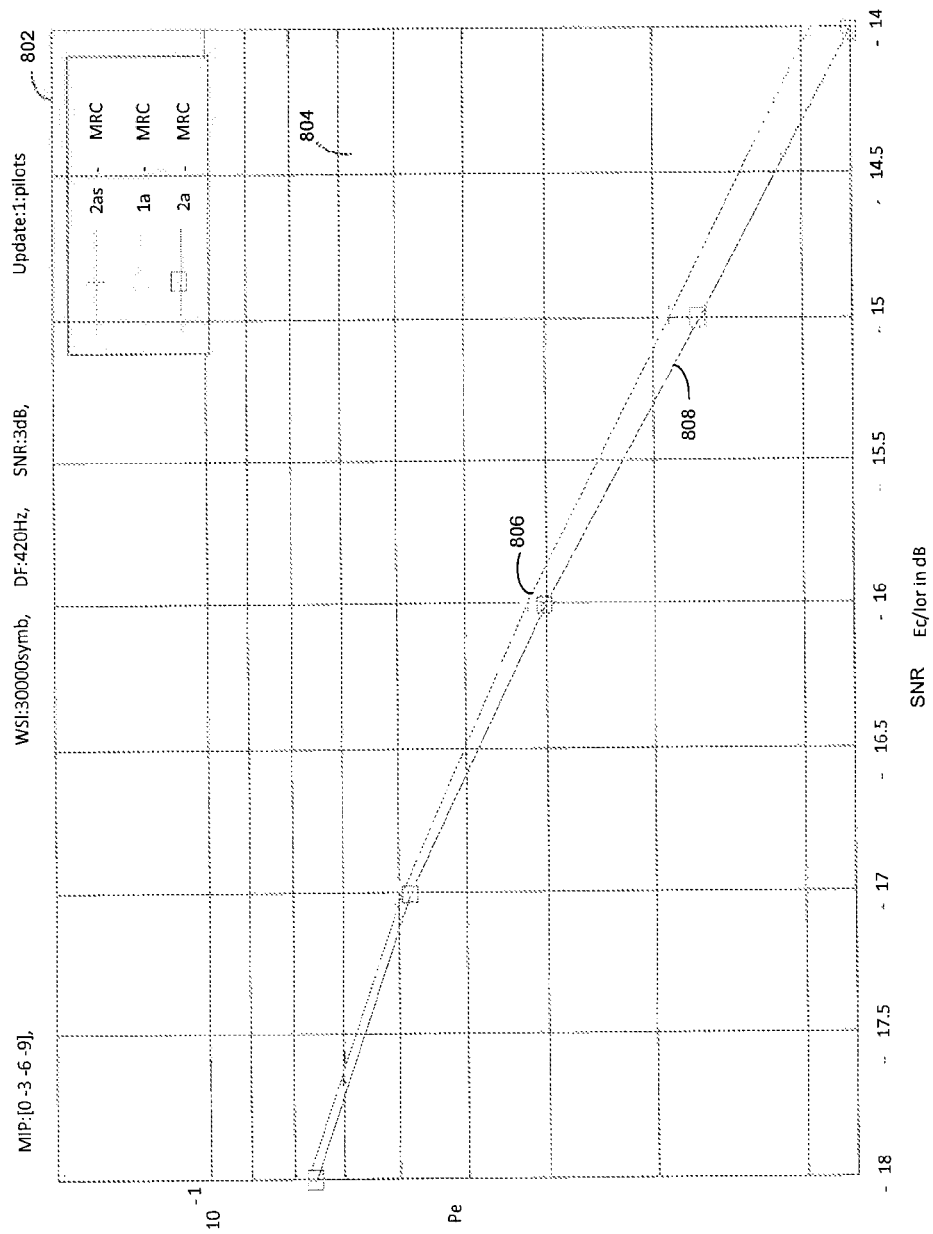
FIG. 8 is a graph illustrating comparison of performance of an exemplary wireless receiver for a sixth test case, in accordance with an embodiment of the invention.

FIG. 8 is a graph illustrating comparison of performance of an exemplary wireless receiver for a sixth test case, in accordance with an embodiment of the invention. Referring to FIG. 8, there is shown a graph 802 illustrating comparison of performance of an exemplary wireless receiver for a sixth test case (Case 6) based on 3GPP TS 25.101. There may be four multipath signals, for example, one multipath at 0 dB, a second multipath at −3 dB, a third multipath at −6 dB and a fourth multipath at −9 dB. The update rate may be 1 pilot signal and the Doppler frequency may be 420 Hz, for example.

The variation of the probability of error as the SNR or (Ec/Ior) increases may be plotted for three different receiver structures. For the first receiver structure with a single antenna and 6 rake fingers, the probability of error as the SNR or (Ec/Ior) increases may be plotted and may be referred to as 1a-MRC 804. For the second receiver structure with two antennas and 6 rake fingers, the probability of error as the SNR or (Ec/Ior) increases may be plotted and may be referred to as 2as-MRC 806. In this receiver structure, the strongest 6 multipath signals may be chosen based on their measured SNR's and the 6 rake fingers may be utilized to demodulate the strongest 6 multipath signals. For the third receiver structure with two antennas and 12 rake fingers, the probability of error as the SNR or (Ec/Ior) increases may be plotted and may be referred to as 2a-MRC 808. In this case, each finger of the rake receiver may demodulate one multipath signal.

The performance of the second receiver structure with two antennas and 6 rake fingers may be same as the performance of the third receiver structure with two antennas and 12 rake fingers when updating at the pilot symbol rate. The gain of the second receiver structure with two antennas and 6 rake fingers compared to the one antenna case may be around 3 dB, for example.

Figure 9:
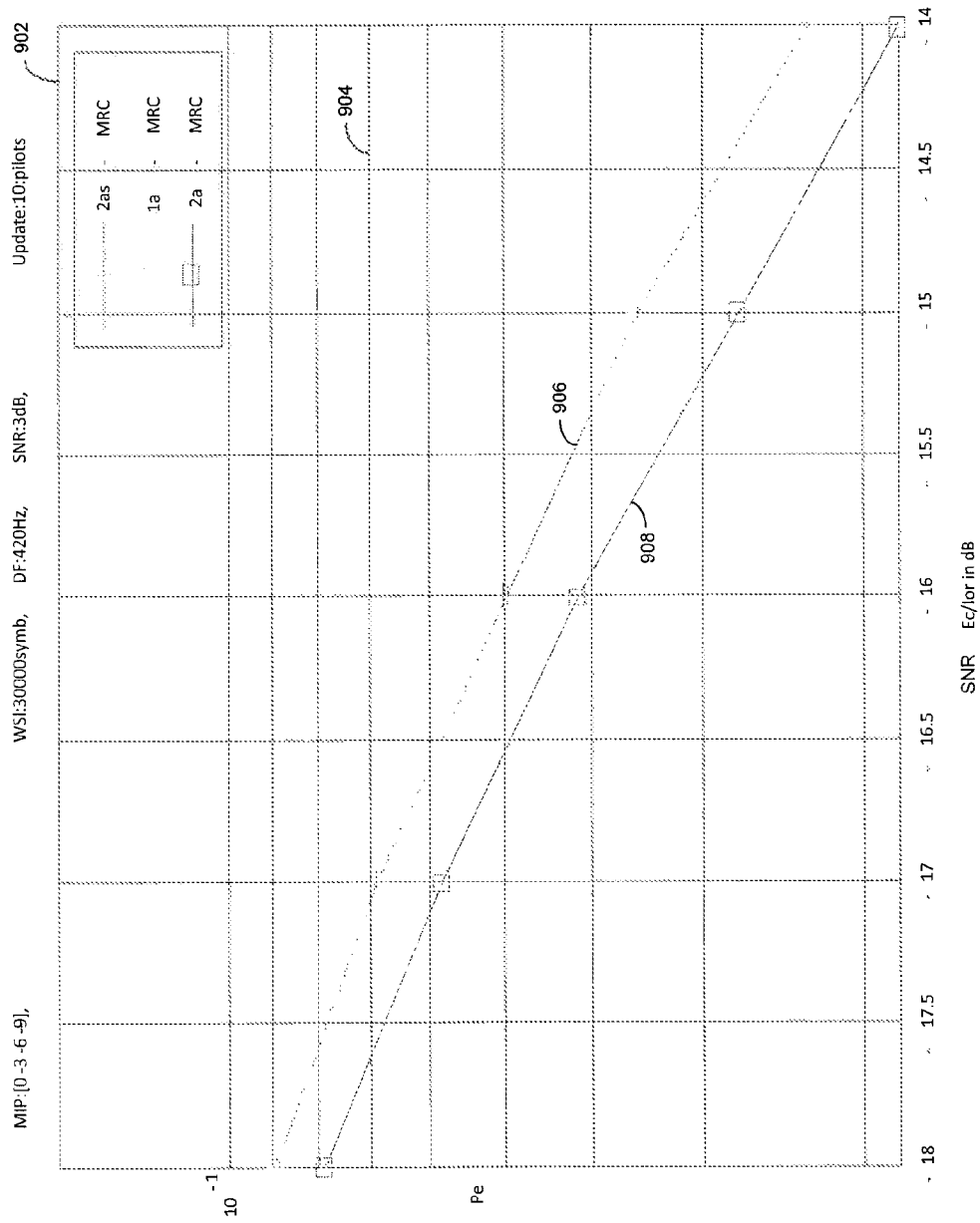
FIG. 9 is a graph illustrating comparison of performance of an exemplary wireless receiver for a sixth test case with a higher slot update rate, in accordance with an embodiment of the invention.

FIG. 9 is a graph illustrating comparison of performance of an exemplary wireless receiver for a sixth test case with a higher slot update rate, in accordance with an embodiment of the invention. Referring to FIG. 9, there is shown a graph 902 illustrating comparison of performance of an exemplary wireless receiver for a sixth test case (Case 6) based on 3GPP TS 25.101. There may be four multipath signals, for example, one multipath at 0 dB, a second multipath at −3 dB, a third multipath at −6 dB and a fourth multipath at −9 dB. The update rate may be 10 pilot signals and the Doppler frequency may be 420 Hz, for example.

The variation of the probability of error as the SNR or (Ec/Ior) increases may be plotted for three different receiver structures. For the first receiver structure with a single antenna and 6 rake fingers, the probability of error as the SNR or (Ec/Ior) increases may be plotted and may be referred to as 1a-MRC 904. For the second receiver structure with two antennas and 6 rake fingers, the probability of error as the SNR or (Ec/Ior) increases may be plotted and may be referred to as 2as-MRC 906. In this receiver structure, the strongest 6 multipath signals may be chosen based on their measured SNR's and the 6 rake fingers may be utilized to demodulate the strongest 6 multipath signals. For the third receiver structure with two antennas and 12 rake fingers, the probability of error as the SNR or (Ec/Ior) increases may be plotted and may be referred to as 2a-MRC 908. In this case, each finger of the rake receiver may demodulate one multipath signal.

The difference in performance of the second receiver structure with two antennas and 6 rake fingers and the performance of the third receiver structure with two antennas and 12 rake fingers may be around 0.5 dB, for example at the slot rate or 10 pilot symbols and a Doppler frequency of 420 Hz. The gain of the second receiver structure with two antennas and 6 rake fingers compared to the one antenna case may be around 3 dB, for example. As the mobile speed increases and update rate decreases, the performance of the second receiver structure with two antennas and 6 rake fingers may decrease.

Figure 10:
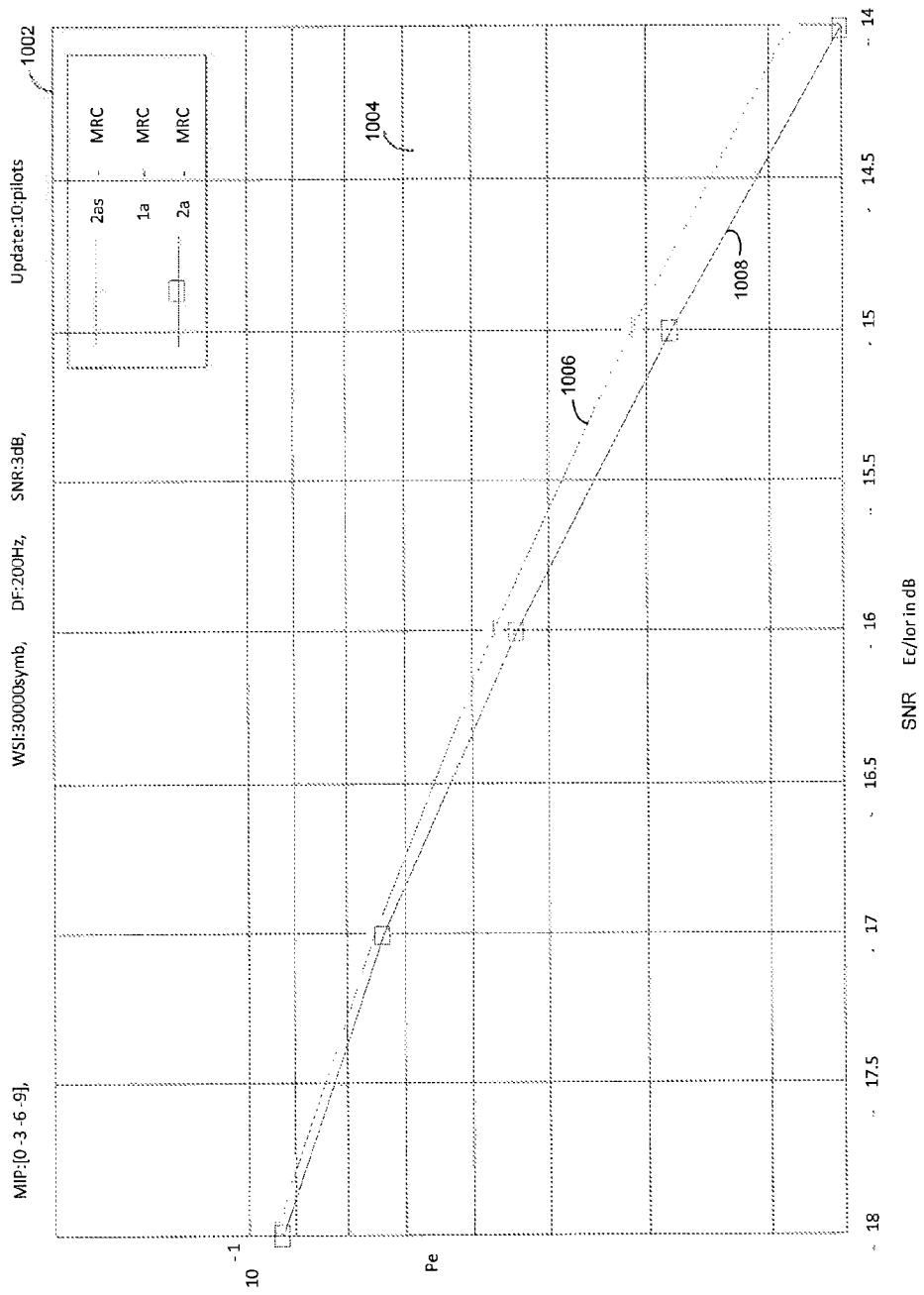
FIG. 10 is a graph illustrating comparison of performance of an exemplary wireless receiver for a third test case, in accordance with an embodiment of the invention.

FIG. 10 is a graph illustrating comparison of performance of an exemplary wireless receiver for a third test case, in accordance with an embodiment of the invention. Referring to FIG. 10, there is shown a graph 1002 illustrating comparison of performance of an exemplary wireless receiver for a third test case (Case 3) based on 3GPP TS 25.101. There may be four multipath signals, for example, one multipath at 0 dB, a second multipath at −3 dB, a third multipath at −6 dB and a fourth multipath at −9 dB. The update rate may be 10 pilot signals and the Doppler frequency may be 420 Hz, for example.

The variation of the probability of error as the SNR or (Ec/Ior) increases may be plotted for three different receiver structures. For the first receiver structure with a single antenna and 6 rake fingers, the probability of error as the SNR or (Ec/Ior) increases may be plotted and may be referred to as 1a-MRC 1004. For the second receiver structure with two antennas and 6 rake fingers, the probability of error as the SNR or (Ec/Ior) increases may be plotted and may be referred to as 2as-MRC 1006. In this receiver structure, the strongest 6 multipath signals may be chosen based on their measured SNR's and the 6 rake fingers may be utilized to demodulate the strongest 6 multipath signals. For the third receiver structure with two antennas and 12 rake fingers, the probability of error as the SNR or (Ec/Ior) increases may be plotted and may be referred to as 2a-MRC 1008. In this case, each finger of the rake receiver may demodulate one multipath signal.

The difference in performance of the second receiver structure with two antennas and 6 rake fingers and the performance of the third receiver structure with two antennas and 12 rake fingers may be around 0.2 dB, for example at the slot rate or 10 pilot symbols and a Doppler frequency of 420 Hz. The gain of the second receiver structure with two antennas and 6 rake fingers compared to the one antenna case may be around 2 dB, for example. As the mobile speed increases and update rate decreases, the performance of the second receiver structure with two antennas and 6 rake fingers may decrease.

Figure 11:
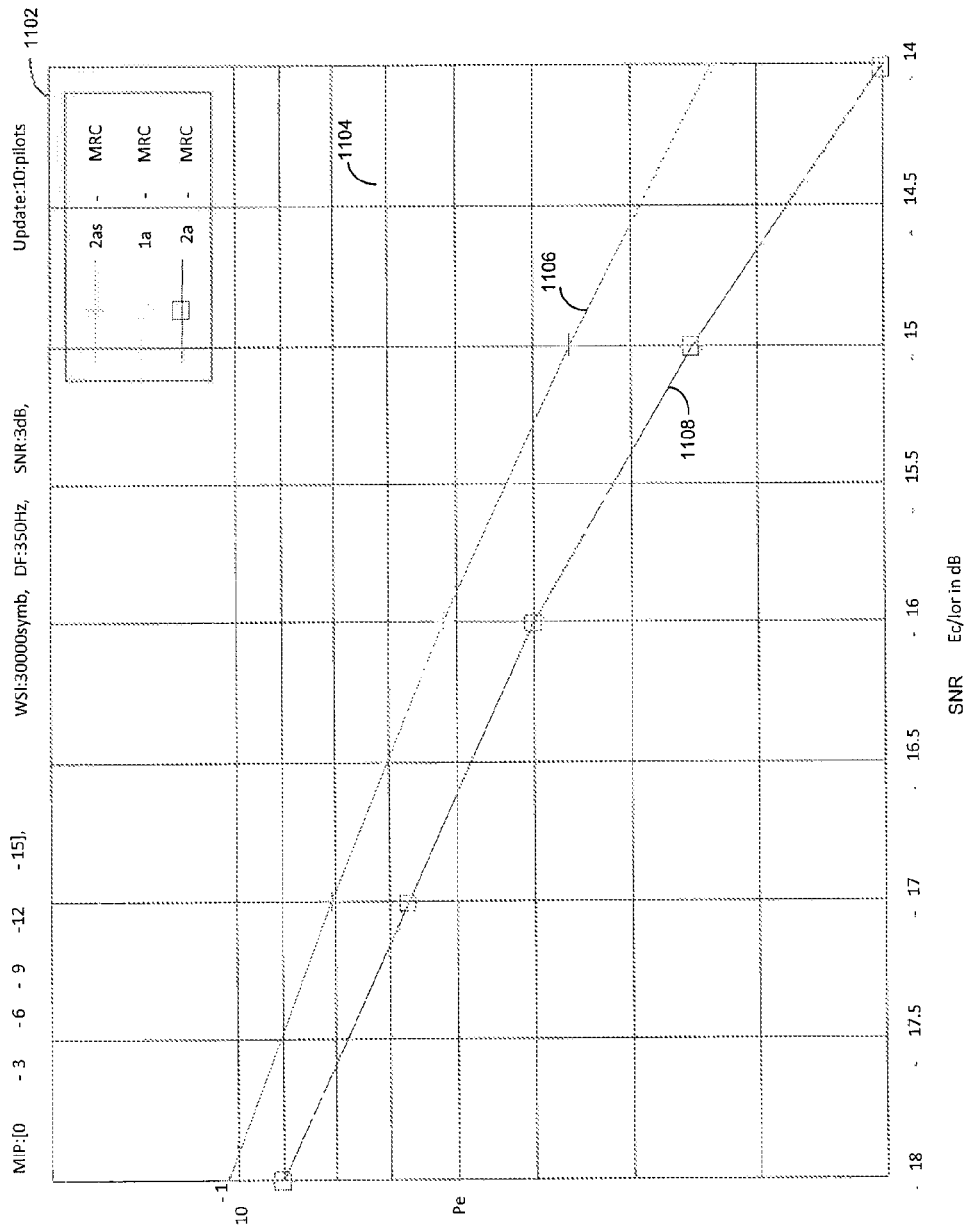
FIG. 11 is a graph illustrating comparison of performance of an exemplary wireless receiver due to soft hand-off (SHO), in accordance with an embodiment of the invention.

FIG. 11 is a graph illustrating comparison of performance of an exemplary wireless receiver due to soft hand-off (SHO), in accordance with an embodiment of the invention. Referring to FIG. 11, there is shown a graph 1102 illustrating comparison of performance of an exemplary wireless receiver due to SHO based on 3GPP TS 25.101. There may be six multipath signals, for example, one multipath at 0 dB, a second multipath at −3 dB, a third multipath at −6 dB, a fourth multipath at −9 dB, a fifth multipath at −12 dB, and a sixth multipath at −15 dB. The update rate may be 10 pilot signals and the Doppler frequency may be 350 Hz, for example.

The variation of the probability of error as the SNR or (Ec/Ior) increases may be plotted for three different receiver structures. For the first receiver structure with a single antenna and 6 rake fingers, the probability of error as the SNR or (Ec/Ior) increases may be plotted and may be referred to as 1a-MRC 1104. For the second receiver structure with two antennas and 6 rake fingers, the probability of error as the SNR or (Ec/Ior) increases may be plotted and may be referred to as 2as-MRC 1106. In this receiver structure, the strongest 6 multipath signals may be chosen based on their measured SNR's and the 6 rake fingers may be utilized to demodulate the strongest 6 multipath signals. For the third receiver structure with two antennas and 12 rake fingers, the probability of error as the SNR or (Ec/Ior) increases may be plotted and may be referred to as 2a-MRC 1108. In this case, each finger of the rake receiver may demodulate one multipath signal.

The difference in performance of the second receiver structure with two antennas and 6 rake fingers and the performance of the third receiver structure with two antennas and 12 rake fingers may be around 0.65 dB, for example at the slot rate or 10 pilot symbols and a Doppler frequency of 420 Hz. The gain of the second receiver structure with two antennas and 6 rake fingers compared to the one antenna case may be around 2 dB, for example. As the mobile speed increases and update rate decreases, the performance of the second receiver structure with two antennas and 6 rake fingers may decrease.

For Case 1 and Case 2, as shown in FIG. 6 and FIG. 7 respectively, the performance of the second receiver structure with two antennas and 6 rake fingers may be similar to the performance of the third receiver structure with two antennas and 12 rake fingers under any updating rate. For case 3 and 6 as shown in FIG. 8, FIG. 9 and FIG. 10, the difference in performance of the second receiver structure with two antennas and 6 rake fingers and the performance of the third receiver structure with two antennas and 12 rake fingers may be around 0.2 dB-0.5 dB, for example at the slot rate or 10 pilot symbols and a Doppler frequency of 420 Hz. The gain of the second receiver structure with two antennas and 6 rake fingers compared to the one antenna case may be around 2 dB, for example. In SHO cases, the difference in performance of the second receiver structure with two antennas and 6 rake fingers and the performance of the third receiver structure with two antennas and 12 rake fingers may be around 0.65 dB, for example at the slot rate or 10 pilot symbols and a Doppler frequency of 420 Hz.

In accordance with an embodiment of the invention, a method and system for achieving space and time diversity gain may include modifying a generalization code of at least one pilot channel, for example, CPICH1 301 or CPICH2 303 for measuring signal strengths of a plurality of received multipath signals. A selection control unit 502 may be enabled to combine a portion of the plurality of received multipath signals based on the measured signal strengths by the plurality of RSCP blocks 328 and 330. The signal strengths of the plurality of received multipath signals may be measured on a primary pilot channel, for example, CPICH1 301 by assigning its generalization code or scrambling code in the descrambler 304 to zero. The signal strengths of the plurality of received multipath signals may be measured on a secondary pilot channel, for example, CPICH2 303 by assigning its generalization code or scrambling code in the descrambler 212 to a non-zero value.

The selection control unit 502 may be enabled to select a portion of the plurality of received multipath signals based on the received RSCP measurements. For example, the selection control unit 502 may generate the six strongest multipath signals among the received 12 multipath signals or a portion of the plurality of received multipath signals that are higher than a particular threshold. The portion of the plurality of received multipath signals selected by the selection control unit 502 may be combined by a maximal ratio combining (MRC) algorithm. The selection control unit 502 may also generate information such as multipath timings, antenna index and the corresponding MRC weights of the generated multipath signals.

Another embodiment of the invention may provide a machine-readable storage, having stored thereon, a computer program having at least one code section executable by a machine, thereby causing the machine to perform the steps as described above for achieving space and time diversity gain.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for achieving space and time diversity gain, comprising:

selectively assigning a first generalization code, corresponding to a primary pilot channel, to zero;

measuring signal strengths for each of a first plurality of multipath signals received on the primary pilot channel, when the first generalization code is assigned to zero;

selectively assigning a second generalization code, corresponding to a secondary pilot channel, to a non-zero value;

measuring signal strengths for each of a second plurality of multipath signals received on the secondary pilot channel, when the second generalization code is assigned to the non-zero value; and combining a selected portion of the first and second plurality of received multipath signals based on the measured signal strengths.

2. The method of claim 1, further comprising measuring a signal to noise ratio (SNR) of the selected portion of the first and second plurality of received multipath signals.

3. The method of claim 1, wherein the combining comprises: combining the selected portion of the first and second plurality of received multipath signals having a signal to noise ratio (SNR) that is higher than a particular threshold value.

4. The method of claim 1, wherein the combining comprises: combining the selected portion of the first and second plurality of received multipath signals utilizing a maximal ratio combining algorithm.

5. The method of claim 1, further comprising multiplying the selected portion of the first and second plurality of received multipath signals by a scrambling code and a delayed version of said scrambling code.

6. The method of claim 5, wherein the delayed version of the scrambling code is determined by a path searcher prior to descrambling the selected portion of the first and second plurality of received multipath signals.

7. A wireless communication device for achieving space and time diversity gain, comprising:
one or more processors configured to:
selectively assign a first generalization code, corresponding to a primary pilot channel, to zero;
measure signal strengths for each of a first plurality of multipath signals received on the primary pilot channel, when the first generalization code is assigned to zero;
selectively assign a second generalization code, corresponding to a secondary pilot channel, to a non-zero value;
measure signal strengths for each of a second plurality of multipath signals received on the secondary pilot channel, when the second generalization code is assigned to the non-zero value; and
combine a selected portion of the first and second plurality of received multipath signals based on the measured signal strengths.

8. The wireless communication device of claim 7, wherein the one or more processors are further configured to measure a signal to noise ratio (SNR) of the selected portion of the first and second plurality of received multipath signals.

9. The wireless communication device of claim 7, wherein the one or more processors are further configured to combine the selected portion of the first and second plurality of received multipath signals having a signal to noise ratio (SNR) that is higher than a particular threshold value.

10. The wireless communication device of claim 7, wherein the one or more processors are further configured to combine the selected portion of the first and second plurality of received multipath signals utilizing a maximal ratio combining algorithm.

11. The wireless communication device of claim 7, wherein the one or more processors are further configured to multiply the selected portion of the first and second plurality of received multipath signals by a scrambling code and a delayed version of said scrambling code.

12. The wireless communication device of claim 11, wherein the delayed version of the scrambling code is determined by a path searcher prior to descrambling the selected portion of the first and second plurality of received multipath signals.

13. A non-transitory computer readable storage medium having instructions stored thereon that, in response to execution by a computing device, cause the computing device to perform operations for achieving space and time diversity gain, the operations comprising:
selectively assigning a first generalization code, corresponding to a primary pilot channel, to zero;
measuring signal strengths for each of a first plurality of multipath signals received on the primary pilot channel, when the first generalization code is assigned to zero;
selectively assigning a second generalization code, corresponding to a secondary pilot channel, to a non-zero value;
measuring signal strengths for each of a second plurality of multipath signals received on the secondary pilot channel, when the second generalization code is assigned to the non-zero value; and
combining a selected portion of the first and second plurality of received multipath signals based on the measured signal strengths.

14. The product of claim 13, further comprising measuring a signal to noise ratio (SNR) of the selected portion of the first and second plurality of received multipath signals.

15. The operations of claim 13, wherein the combining comprises: combining the selected portion of the first and second plurality of received multipath signals having a signal to noise ratio (SNR) that is higher than a particular threshold value.

16. The operations of claim 13, wherein the combining comprises: combining the selected portion of the first and second plurality of received multipath signals utilizing a maximal ratio combining algorithm.

17. The operations of claim 13, further comprising multiplying the selected portion of the first and second plurality of received multipath signals by a scrambling code and a delayed version of said scrambling code.

18. The operations of claim 14, wherein the delayed version of the scrambling code is determined by a path searcher prior to descrambling the selected portion of the first and second plurality of received multipath signals.

* * * * *

UNITED STATES PATENT AND TRADEMARK OFFICE
CERTIFICATE OF CORRECTION

| | | |
|---|---|---|
| PATENT NO. | : 9,077,399 B2 | Page 1 of 1 |
| APPLICATION NO. | : 13/785788 | |
| DATED | : July 7, 2015 | |
| INVENTOR(S) | : Botha et al. | |

It is certified that error appears in the above-identified patent and that said Letters Patent is hereby corrected as shown below:

In the Specification
In column 1, line 8, replace "Oct. 11, 2011" with --Oct. 5, 2011--.

In the Claims
In column 20, line 37, replace "product" with --operations--.

Signed and Sealed this
Second Day of February, 2016

Michelle K. Lee
*Director of the United States Patent and Trademark Office*